Oct. 25, 1932.  F. H. SCHWERIN  1,884,296
HOISTING DEVICE
Filed July 16, 1931  2 Sheets-Sheet 2

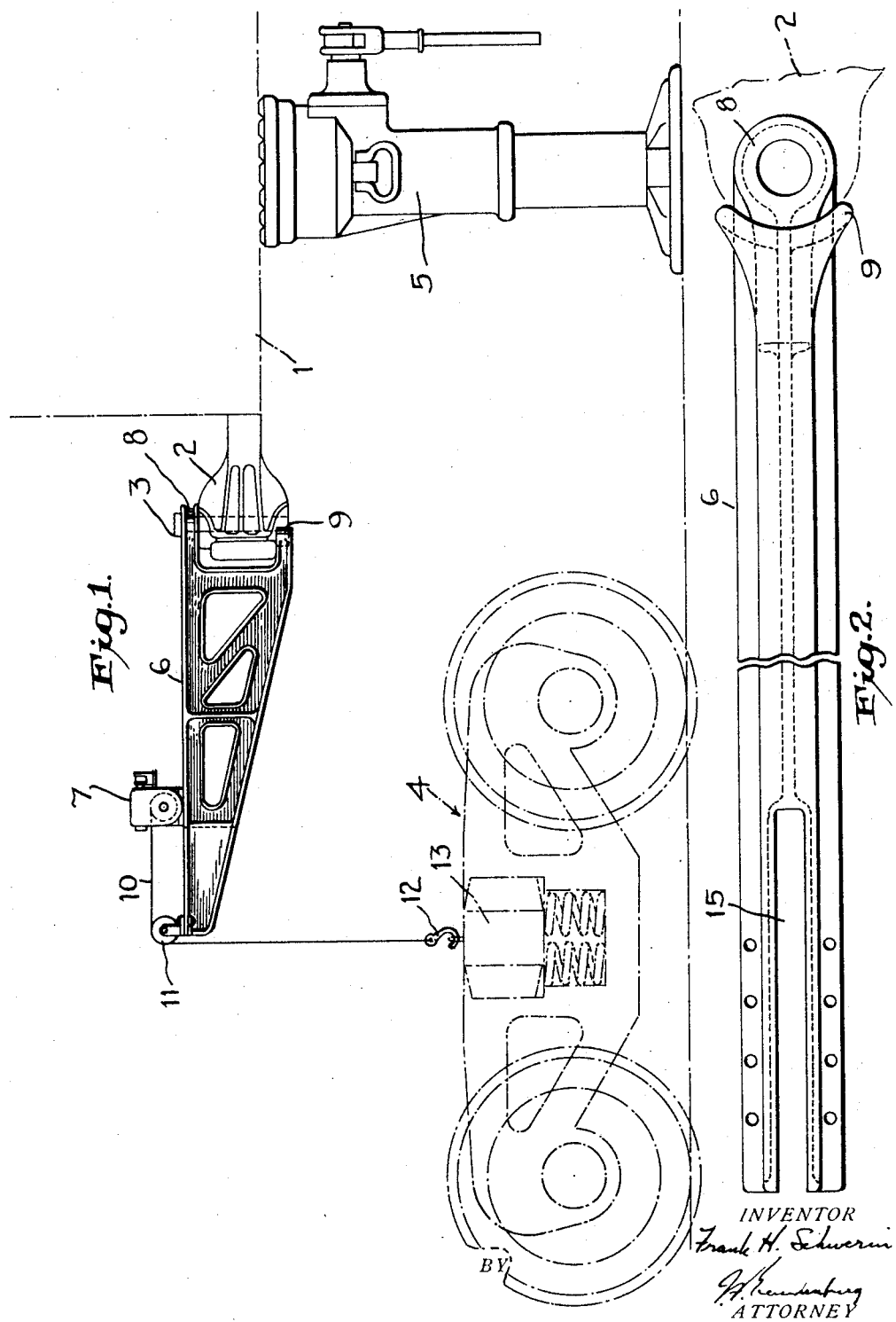

INVENTOR
Frank H. Schwerin
BY
ATTORNEY

Patented Oct. 25, 1932

1,884,296

UNITED STATES PATENT OFFICE

FRANK H. SCHWERIN, OF BELLEVUE BOROUGH, PENNSYLVANIA, ASSIGNOR TO THE DUFF-NORTON MANUFACTURING COMPANY, OF PITTSBURGH, PENNSYLVANIA, A CORPORATION OF PENNSYLVANIA

HOISTING DEVICE

Application filed July 16, 1931. Serial No. 551,102.

The present invention relates to the repair of railroad car trucks, and has for its object to provide improved apparatus which will enable such repair to be effected in a more efficient and expeditious manner than has heretofore been possible.

As is well known, before a railroad car truck can be repaired it is necessary to jack up the car end and to roll the truck from beneath the same.

Various means, more or less unsatisfactory however, have previously been used for lifting any desired parts of the detached truck for the purpose of dismantling or repairing the same, but according to the present invention the apparatus contemplated for this purpose comprises a supporting member adapted to be mounted upon the car coupling member, preferably in a swingable manner, and hoisting means such as a winch or rack jack carried by said supporting member, the hook and chain of which can be attached to any desired part of the truck so that the same is readily lifted when the jack is operated.

The invention will now be described in more detail with reference to the accompanying drawings, wherein:

Fig. 1 is a side elevation showing a car end lifted, the truck rolled out from beneath it, and my improved apparatus mounted upon the car coupling member in position ready to lift the bolster of the truck.

Fig. 2 is an enlarged under-side plan view of the supporting member.

Figure 3:
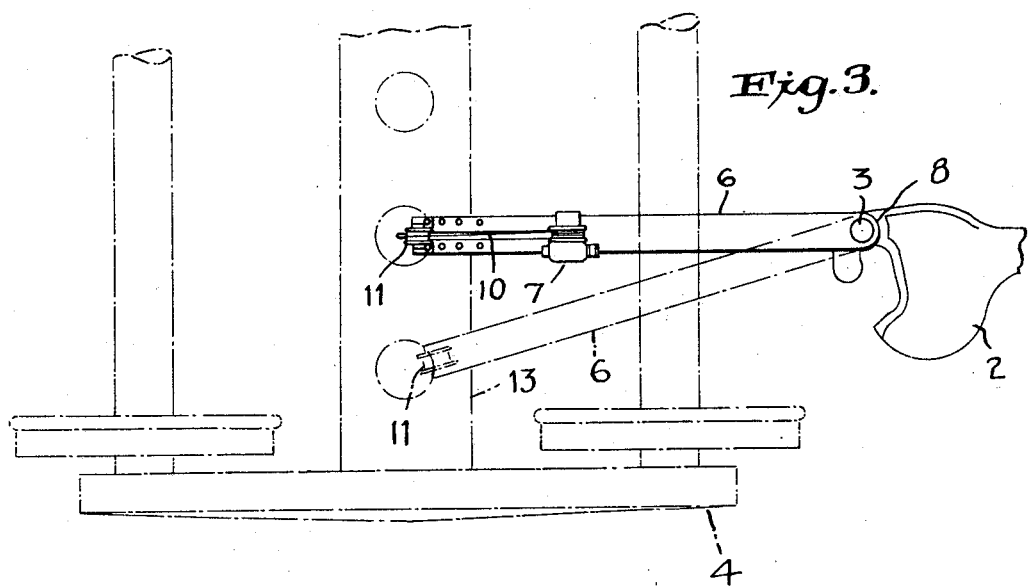
Fig. 3 is a partial plan view of Fig. 1, one side of the truck and the car end being omitted.

Referring to Fig. 1, the car end 1 with attached car coupling member 2 having a coupling pin 3, and the truck 4 are of any known construction and form no part of the present invention. The truck is shown rolled from beneath the car end after the latter has been raised to permit of this by the jack 5.

The improved apparatus of the present invention comprises a cantilever supporting member 6 adapted to be mounted upon the car coupling 2 and carrying hoisting means in the form of a winch-jack 7. This member 6 is of skeleton girder construction and is swingably mounted upon the coupling 2, as shown in broken lines in Fig. 3, by means of an upper eyelet extension 8, through which the coupling pin 3 is passed, and a lower concave abutment 9 which bears against a convex lower hub of the pin bearing. The abutment may be shaped to engage some other part of the coupling if desired. The cable 10 of the jack passes over the pulley 11 and its hook 12 may be attached to the part of the truck to be lifted, it being shown attached to the bolster 13 thereof. Provision is made for adjustment of the hoist lengthwise of the support. In this form of the invention the frame of the pulley 11 is arranged to be bolted or otherwise secured at different points along the top of the support, toward its outer end.

Figure 4:
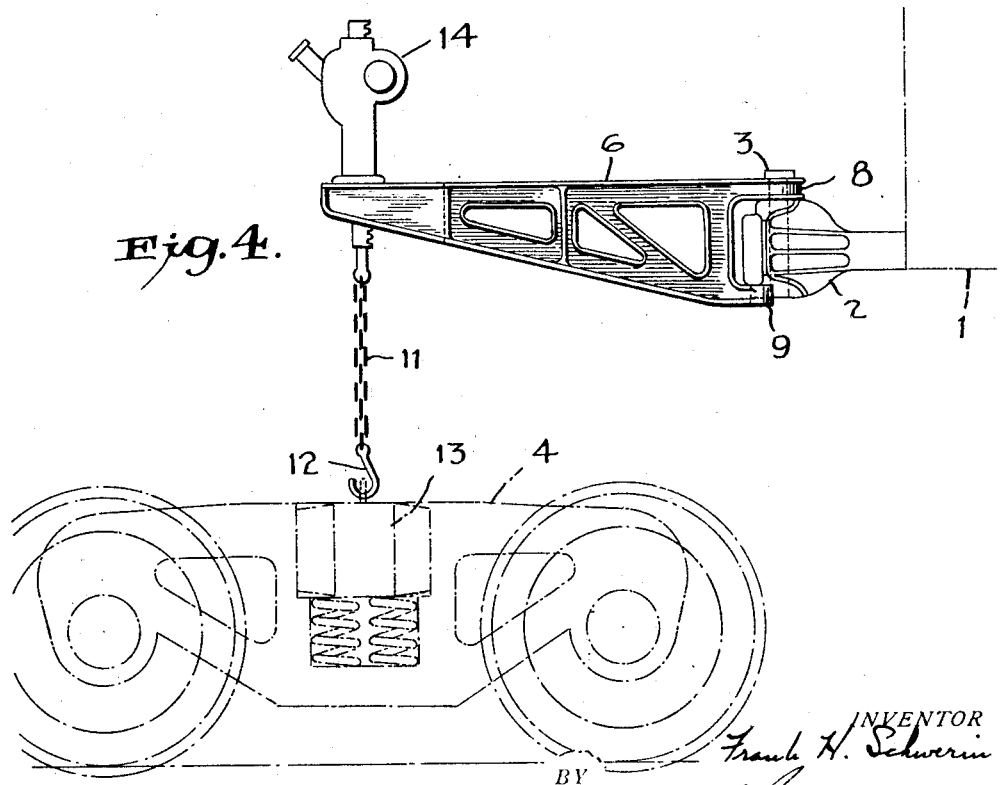
Fig. 4 is a view similar to Fig. 1 but showing a different type of hoisting means.

A modification of the invention is shown in Fig. 4, wherein a rack-jack 14 is used as the hoisting means instead of the winch-jack shown in Fig. 1.

The free end of the supporting member 6 may be bifurcated as shown at 15 in Fig. 2 for the purpose of accommodating either the cable of the hoisting means or the rack member thereof.

In the operation of the invention the car end 1 is lifted by the jack 5 and the truck 4 rolled clear thereof, whereupon the supporting member 6 is mounted upon the car coupling 2 and any desired part of the truck can then be lifted by the hoisting means 7 or 14.

I claim:

1. Apparatus for facilitating the repair of railroad car trucks having a car coupling upon the car end with a coupling pin and a lower curved coupling pin hub portion, comprising a supporting member, an eyelet extension on one end of the supporting member, a concave abutment below the eyelet extension on the same end of the supporting member, said supporting member being swingably mountable upon said coupling through the medium of the eyelet extension engaging the coupling pin and the lower concave abutment engaging the coupling pin hub portion of the coupling, and hoisting means carried by said supporting member for lifting any desired part of the car truck.

2. An article of manufacture, comprising a beam for connecting with a railway car coupler, the upper portion of one end of the beam extending horizontally and having a vertical hole for receiving the pin of the coupler, and a lower portion of the same end of the beam being shaped to engage a face of the coupler.

3. An article of manufacture comprising a tapered beam for connecting with a railway car coupler, the heavy end of the beam being formed with a horizontally extending end portion having a vertical hole for registering with the pin hole of the coupler and receiving the coupling pin, the lower portion of the heavy end of the beam being formed with a concave surface for engaging a convex face on the lower coupling pin hub of the coupler.

4. An article of manufacture comprising a tapered beam for connecting with a railway car coupler, the heavy end of the beam having a horizontally extending upper portion and a hole through said upper portion, the axis of the hole being substantially at right angles to the top side of the beam, a concave face on the lower portion of the heavy end beam for engaging the lower coupling pin hub of the coupler, the hole and concave face being located in such relative positions that when the pin of the coupler is inserted through the hole and the concave face is in engagement with the pin hub, the top side of the beam will be substantially horizontal, the light end of the beam being bifurcated to provide a longitudinal slot extending through the top and bottom faces of the beam.

5. Lifting apparatus including in combination a railway car coupler connected with a car; a horizontal supporting arm, one end of which contacts with the coupler; a vertical coupling pin connecting the supporting arm to the coupler for oscillation in a horizontal plane, said pin preventing vertical movement of said supporting arm so that the arm is supported as a cantilever beam; and hoist means mounted on the supporting arm.

6. In combination with a railway car, a coupler at the car end; an arm having one end in contact with the coupler; an extending portion on said end of the arm; a coupling pin through the coupler and the extending portion of the arm to pivotally connect the arm to the coupler; a face on the end of the arm below the extending portion for bearing against the coupler so that the arm is supported as a cantilever beam having oscillation in a horizontal plane; and a hoisting means supported on the arm including a flexible element extending downwardly from the arm for connecting with a load to be lifted.

7. In combination with a railway car, a coupler at the car end; an arm having one end in contact with the coupler; an extending portion on said end of the arm; a coupling pin through the coupler and the extending portion of the arm to pivotally connect the arm to the coupler; a face on the end of the arm below the extending portion for bearing against the coupler so that the arm is supported as a cantilever beam having oscillation in a horizontal plane; a bifurcated end portion on the end of the arm remote from the coupling; and a hoist on the arm including means extending downwardly through the slot in said bifurcated end portion.

8. In combination with a railway car, a coupler at the car end; an arm having one end in contact with the coupler; a coupling pin pivotally connecting said end of the arm to the coupler so that the arm can oscillate in a horizontal plane; means for holding the arm in a horizontal plane during its oscillating movement; and hoisting means on the arm extending downwardly from the arm for connecting with a load to be lifted.

FRANK H. SCHWERIN.